Aug. 23, 1932.  C. H. VEEDER  1,873,079
COUNTER ACTUATING MECHANISM
Original Filed Jan. 30, 1929
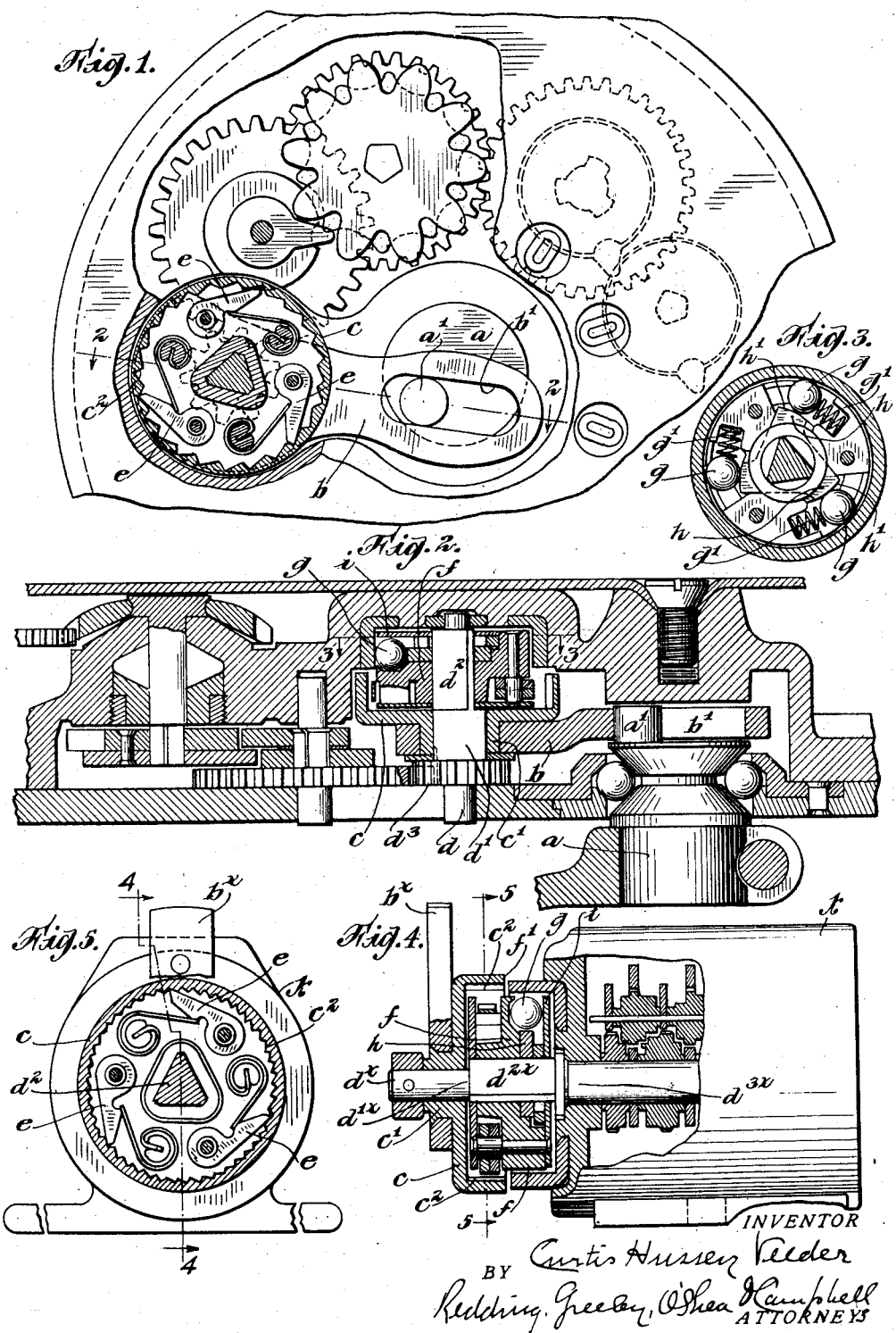
INVENTOR
Curtis Hussey Veeder
BY Redding, Greeley, O'Shea & Campbell
ATTORNEYS Patented Aug. 23, 1932

1,873,079

UNITED STATES PATENT OFFICE

CURTIS HUSSEY VEEDER, OF HARTFORD, CONNECTICUT, ASSIGNOR TO VEEDER-ROOT INCORPORATED, OF HARTFORD, CONNECTICUT, A CORPORATION OF CONNECTICUT

COUNTER ACTUATING MECHANISM

Application filed January 30, 1929, Serial No. 336,079. Renewed July 22, 1931.

In the application of mechanical counters to the registration of reciprocating movements it is necessary to employ reciprocating clutches of some nature, such as a pawl engaging a ratchet wheel, or a friction clutch employing a ball, or roller, or block, to engage the friction wheel. Whatever the form of clutch, two clutches must be employed—one a driving clutch to produce the forward motion and the other a retaining clutch to prevent the backward motion of the driven mechanism on the return stroke. The friction clutch has the advantage that the reciprocating part of the clutch may be moved through any degree desired and will engage the driven part of the clutch on the forward stroke with very little lost motion. With the ratchet and pawl clutch it is necessary to move the driving lever or wheel through an angular distance, called the overthrow, greater than that occupied by one tooth of the ratchet so that the pawl can drop in behind the next tooth at the end of the stroke. It is also necessary that the length of the stroke be accurately stopped at each end, and that the driving lever be accurately located in angular position with reference to the parts of the clutch. In many cases the necessity for the arcuate adjustment of the driving lever involves considerable expense.

For many uses it is necessary that the driven mechanism, such as a counter, be removed through a definite division of the circle. In this case it is not practical to use the friction clutch. The slight lost motion at each end of the stroke is variable and any wear in the driving mechanism would cause a variation in the length of the stroke. With the ratchet and pawl mechanism the forward movement is governed by the angular space occupied by a ratchet tooth and is, therefore, a definite division of the circle.

For these reasons it has been found to be difficult, with due regard to manufacturing costs and the attainment of the necessary accuracy and dependability, to employ either two friction clutches for both driving purposes and retaining purposes or two pawl clutches for both driving purposes and retaining purposes. In the effort to overcome the difficulties hitherto met with in the actuation of counters under the conditions referred to it has been found that the necessary definiteness of actuation can be secured without the exercise of excessive care in manufacture and therefore without increasing unduly the cost by the combination of a pawl driving clutch and a ball or other friction retaining clutch, the pawls of the driving clutch insuring advance of the wheel through absolutely definite and uniform divisions and the balls of the retaining clutch functioning to retain the wheel in its advanced position, without the establishment and maintenance of an exact relation between the driving clutch and the retaining clutch. The invention will be more fully explained hereinafter with reference to the accompanying drawing in which an embodiment thereof is illustrated, and in which:

Figure 1 is a view in end elevation with some parts broken away and with some parts in section on a plane transverse to the axis, of a portion of a counting mechanism with the improved actuating mechanism applied thereto.

Figure 2 is a detail view in section on the plane indicated by the broken line 2—2 of Figure 1 and with the development, also in section, of transmitting devices.

Figure 3 is a detail view of the ball clutch in section on the plane indicated by the broken line 3—3 of Figure 2, looking in the direction of the arrows.

Figure 4 is a view in longitudinal sectional elevation illustrating the application of the invention to the operation of a counter in which the several wheels are mounted upon a common axis, instead of being arranged about a central axis as in Figure 1.

Figure 5 is a view in sectional elevation, the plane of section being indicated by the broken line 5—5 of Figure 4, a portion of the actuating lever being also shown.

In the embodiment of the invention which has been chosen for illustration in Figures 1, 2 and 3 the operation of the counting mechanism is initiated by the relative circular motion of a shaft $a$ armed with an eccentric pin $a^1$. So far as the description of the present invention is concerned it may be assumed that the shaft $a$ is rotated upon its own axis and that the eccentric pin $a^1$ engages the slot $b^1$ of a slotted lever $b$ which is fixed on a hub $c^1$ of one member $c$ of a pawl and ratchet clutch. In this instance, the member $c$ which oscillates with the lever $b$ is the toothed or ratchet member of the pawl clutch and is mounted for relative rotation on an extended portion $d^1$ of a transmission shaft $d$. The oscillations of the member $c$ of the pawl clutch are transmitted through the engagement of the internal ratchet teeth $c^2$ by spring pressed pawls $e$ carried by an intermediate member $f$ which is fixed on the shaft $d$, as by being fitted upon the polygonal portion $d^2$ thereof. The opposite face of the intermediate member $f$ is formed to receive the balls $g$ of the retaining friction clutch, the balls being urged by springs $g^1$ in a direction to engage the cammed surfaces $h^1$ of the cooperating member $h$ which is fixed upon the polygonal portion $d^2$ of the shaft $d$. It will be understood that the balls $g$ are supported in position by a plate $i$, the construction being such, as is usual in ball clutches, that the balls permit advancing movement of the cooperating member $h$ and therefore of the shaft $d$ but act to prevent backward movement thereof.

By the construction described the shaft $d$ receives at each oscillation of the driving lever $b$, through the driving pawl clutch, an advance movement through a definite division of a complete movement of rotation and after each such advance movement it is retained in its advanced position during the next backward movement of the actuating lever, by the immediate engagement of the friction retaining clutch. The shaft $d$ is shown as having secured thereon a gear $d^3$ which may be regarded as a wheel of the counting mechanism and from which the several counting wheels may be actuated in a manner and by mechanism well understood and not necessary to be described herein.

In Figures 4 and 5 the invention is illustrated as applied to a counter in which the several number wheels are mounted upon a common shaft instead of being grouped about a central axis, as indicated in Figure 1. The construction of the actuating mechanism is the same in all respects as described with reference to Figures 1, 2 and 3. The actuating lever $b^x$, oscillated by some part of the machine to which the counting mechanism is applied, is fixed to the internally toothed member $c$ of the pawl clutch, the member $c$ being mounted upon the reduced portion $d^{1x}$ of the shaft $d^x$, and the pawls $e$ are carried by the intermediate member $f$. The balls of the friction clutch are supported between the intermediate member $f$ and the plate $i$ and engage the cammed surfaces of the cooperating member $h$ which, as before, is mounted upon the polygonal portion $d^{2x}$ of the shaft $d^x$. In this construction, moreover, the shaft $d^x$ is extended within the casing $k$ of the numbering machine, as at $d^{3x}$, to support the number wheels one of which is shown in part.

As a result of this construction, it will be noted that a standard form of counter may be provided in the casing, as distinguished from the special form of counter heretofore provided, i. e. one having a double ratchet clutch mechanism on the end of its shaft remote from the actuating lever. The location of the actuating and retaining mechanism externally of the counter casing, rather than inside the casing and on the opposite end of the counter shaft, also permits a ready connection of the actuating lever to either member of the clutch as may be desired under varying circumstances. The arrangement of the ball retaining clutch between the ratchet mechanism and the counter casing also has the advantage of permitting the stationary member of the retaining clutch to be readily connected to the counter casing or to be carried upon a bracket which supports the counter unit as may be desired.

When the angular motion of the driving clutch is small a driving lever $b^x$ is commonly used. In some cases it is necessary that the counting mechanism be turned through various angular distances from one tooth to several revolutions. In this case the lever may be replaced by a gear wheel engaging in a reciprocating rack or a drum driven by a flexible tape.

In the operation of the device the operating lever ($b$ in Figures 1 and 2; $b^x$ in Figures 4 and 5) having reached the limit of its forward or actuating swing, the point of pawl $e$ will be in engagement with a tooth of internally toothed member $c$, and, as the operating lever swings in the opposite direction, the point of the pawl will be moved to the rear of the next tooth of internally toothed member $c$. This rearward movement must, of course, be sufficient to carry the point of the pawl to the rear of the next tooth but may exceed the distance between two adjacent teeth provided it is not sufficient to carry the point of the pawl to the rear of a second tooth. On the forward swing of the operating lever, the point of the pawl will be moved forward toward the rear face of the tooth to the rear of which it was moved. It will also be brought into contact with this rear face at a point in its forward movement depending upon the extent of its rearward movement with reference to the spacing of the several teeth. Its further forward movement then will cause the internally toothed member to rotate through such arc as may be required to cause the unit wheel of counter mechanism to be rotated a unit space. As the operating lever reaches the limit of its forward or operating swing, the internally toothed member *c* will be held in the position to which it was thus moved by the friction clutch.

It will thus be seen that while it is desirable that the teeth of the internally toothed member *c* should be uniformly spaced, precise uniformity of spacing is not essential. Further, while such uniformity of spacing may be important if a plurality of pawls *e* are used, precise uniformity of spacing is not essential or particularly important if a single pawl *e* is used, provided no two adjacent teeth are so widely separated that the rearward movement of the pawl will carry its point to the rear of the second tooth. It should also be noted that the movement of the operating lever may vary, provided its forward movement is of sufficient extent to cause the internally toothed member *c* to be rotated through a definite arc, that is, through the arc necessary to cause a unit movement of the counter.

I claim as my invention:

1. An actuating mechanism comprising an oscillating member, a driven member, a pawl clutch interposed between the oscillating member, and the driven member, and a retaining friction clutch to prevent backward movement of the driven member.

2. An actuating mechanism comprising an oscillating member, a pawl clutch having one of its members in operative relation with the oscillating member, a driven member, an intermediate clutch member in operative relation with the driven member to effect forward movement thereof, and retaining friction clutch devices in operative relation with the intermediate member to prevent backward movement thereof and of the driven member.

3. An actuating mechanism comprising an oscillating member, a toothed clutch member in operative relation with the oscillating member, an intermediate pawl carrying a clutch member for co-operation with the toothed clutch member, retaining friction clutch devices in operative relation with the intermediate member to prevent backward movement thereof, and a driven member in operative relation with the intermediate clutch member.

4. An actuating mechanism comprising an oscillating member, an internally toothed clutch member, an intermediate pawl carrying member in operative relation with the internally toothed member, retaining friction clutch devices in operative relation with the intermediate clutch member to prevent backward movement thereof, and a driven member in operative relation with the intermediate clutch member.

5. A counter actuating mechanism comprising a member to be driven, an oscillating member arranged to be oscillated by an element of which the movements are to be counted, a pawl and ratchet clutch interposed between the element of which the movements are to be counted and the member to be driven having one of its elements operatively connected with the member to be driven and having its other element operatively connected with the oscillating member, and a retaining friction clutch in operative relation with the member to be driven for preventing backward movement.

6. A counter actuating mechanism comprising a member to be driven, an oscillating member arranged to be oscillated by an element of which the movements are to be counted, a pawl and ratchet clutch interposed between the element of which the movements are to be counted and the member to be driven having one of its elements operatively connected with the member to be driven and having its other element operatively connected with the oscillating member, and a retaining friction clutch having one of its elements carried by the member to be driven for preventing backward movement.

7. A counter actuating mechanism comprising a member to be driven, an oscillating member arranged to be oscillated by an element of which the movements are to be counted, a pawl and ratchet clutch comprising a toothed ratchet member interposed between the element of which the movements are to be counted and the member to be driven, having one of its elements operatively connected with the member to be driven and having its other element operatively connected with the oscillating member, the space between adjacent teeth of the ratchet member being not greater than the movement imparted to the oscillating member, and a retaining friction clutch in operative relation with the member to be driven for preventing backward movement.

8. A counter actuating mechanism comprising a member to be driven, an oscillating member arranged to be oscillated by an element of which the movements are to be counted, a pawl and ratchet clutch comprising an internally toothed ratchet member, interposed between the element of which the movements are to be counted and the member to be driven, having one of its elements operatively connected with the member to be driven and having its other element operatively connected with the oscillating member, the space between adjacent teeth of the ratchet member being not greater than the movement imparted to the oscillating member, and a retaining friction clutch in operative relation with the member to be driven for preventing backward movement.

9. A counter actuating mechanism comprising a member to be driven, an oscillating member arranged to be oscillated by an element of which the movements are to be counted, a pawl and ratchet clutch comprising an internally toothed ratchet member having teeth uniformly spaced apart, interposed between the element of which the movements are to be counted and the member to be driven, having one of its elements operatively connected with the member to be driven and having its other element operatively connected with the oscillating member, the arrangement being such that the movement imparted to the oscillating member is not less in extent than the movement necessary to be given to the member of the pawl and ratchet clutch, and a retaining friction clutch in operative relation with the member to be driven for preventing backward movement.

10. The combinaton with a counter having an operating member, of a combined pawl and ratchet driving and friction retaining clutch operatively connected between said counter and said operating member.

11. The combination with a counter having a shaft, counting elements coaxial therewith on one end of said shaft, and an operating member on the opposite end of said shaft, of a combined pawl and ratchet driving and friction retaining clutch disposed axially on said shaft between said counting elements and operating member.

12. The combination with a counter comprising a casing, counter mechanism therein, and a protruding operating shaft projecting from one end of said casing, of an operating member on the projecting end of said shaft, and a combined pawl and ratchet driving and friction retaining clutch operatively connected between said counter and said operating member and disposed axially on said shaft between said casing and operating member.

13. A counter actuating mechanism adapted to be applied to the driving shaft of a counting mechanism, comprising a pawl and ratchet driving clutch and a retaining friction clutch, the pawl and ratchet clutch comprising a member oscillatable with reference to said driving shaft and a member operatively connected with said driving shaft to rotate it, and the friction clutch comprising a member rotatable with said driving shaft and a member adapted to be held against rotation, and an operating means operatively connected to one member of the pawl and ratchet clutch.

14. A counter actuating mechanism adapted to be applied to the driving shaft of a counting mechanism, comprising a pawl and ratchet driving clutch and a retaining friction clutch, the pawl and ratchet clutch comprising a member oscillatable with reference to said driving shaft and a member operatively connected with said driving shaft to rotate it, and the friction clutch comprising a member rotatable with said driving shaft formed in one piece with the pawl and ratchet clutch member and operatively connected with the driving shaft, and a member adapted to be held against rotation, and an operating means operatively connected to one member of the pawl and ratchet clutch.

15. A counter actuating mechanism adapted to be applied to the driving shaft of a counting mechanism, comprising a pawl and ratchet driving clutch and a retaining friction clutch, the pawl and ratchet clutch comprising an outer member oscillatable with reference to said driving shaft and an inner member operatively connected with said driving shaft to rotate it, and the friction clutch comprising an inner member rotatable with said driving shaft and an outer member held against rotation, and an operating means operatively connected with the outer member of the pawl and ratchet clutch.

16. A counter actuating mechanism adapted to be applied to the driving shaft of a counting mechanism, comprising a pawl and ratchet driving clutch and a retaining friction clutch, the pawl and ratchet clutch comprising an internally toothed outer member oscillatable with reference to said driving shaft and an inner pawl carrying member operatively connected with said driving shaft to rotate it, and the friction clutch comprising an inner member rotatable with said driving shaft and an outer member held against rotation, and an operating means operatively connected to one member of the pawl and ratchet clutch.

This specification signed this 25th day of January A. D. 1929.

CURTIS HUSSEY VEEDER.